United States Patent
Ismaili et al.

(10) Patent No.: US 12,100,055 B2
(45) Date of Patent: *Sep. 24, 2024

(54) DETERMINING AN EVENT

(71) Applicant: Allstate Insurance Company, Northbrook, IL (US)

(72) Inventors: Alinawaz Ismaili, Skokie, IL (US); Joel T. Dewall, Libertyville, IL (US); Randolph Kwan, Wheeling, IL (US); Dennis M. Griffin, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,742

(22) Filed: Feb. 27, 2023

(65) Prior Publication Data

US 2023/0289891 A1 Sep. 14, 2023

Related U.S. Application Data

(63) Continuation of application No. 17/315,806, filed on May 10, 2021, now Pat. No. 11,615,479, which is a
(Continued)

(51) Int. Cl.
*G06Q 40/08* (2012.01)
*G06F 16/2457* (2019.01)
(Continued)

(52) U.S. Cl.
CPC ....... *G06Q 40/08* (2013.01); *G06F 16/24575* (2019.01); *G06Q 10/0635* (2013.01);
(Continued)

(58) Field of Classification Search
None
See application file for complete search history.

(56) References Cited

U.S. PATENT DOCUMENTS

| 6,044,257 A | 3/2000 | Boling et al. |
| 6,064,970 A | 5/2000 | McMillan et al. |

(Continued)

FOREIGN PATENT DOCUMENTS

| CN | 101918932 A | 12/2010 |
| CN | 203391683 U | 1/2014 |

(Continued)

OTHER PUBLICATIONS

Yoon, D. et al., "Future Automotive Insurance System based on Telematics Technology", downloaded from the internet http://webcache.googleusercontent.com/search?q=cache:WrsAwMmI0UQJ:www.researchgate.net/publication/224310637_Future_Automotive_Insura . . . , dated Sep. 25, 2014, pp. 1-4.

(Continued)

*Primary Examiner* — Joseph W. King
(74) *Attorney, Agent, or Firm* — DINSMORE & SHOHL LLP (57) ABSTRACT

A system allows for a user to notify an insurance provider or other third-party with a button press. The button can notify of an emergency situation. An event determiner may analyze information of events surrounding the button click. This information may include the time of day, location, identifying information for the insured, recent locations of the button, information from similar button presses and information from previous insurance claims. Based on this information, the event determiner may provide a high percentage estimate of an abnormal condition: home break-in, car accident, flat tire, etc. The system may automatically take action, depending on the event, such as contacting the police, sending a tow truck, or starting an insurance claim.

20 Claims, 4 Drawing Sheets

Related U.S. Application Data continuation of application No. 16/570,148, filed on Sep. 13, 2019, now Pat. No. 11,010,839, which is a continuation of application No. 14/628,953, filed on Feb. 23, 2015, now Pat. No. 10,430,889.

(51) Int. Cl.
| | | |
|---|---|---|
| *G06Q 10/0635* | (2023.01) | |
| *G08B 21/00* | (2006.01) | |
| *G08B 23/00* | (2006.01) | |
| *G08B 25/01* | (2006.01) | |

(52) U.S. Cl.
CPC ............. *G08B 21/00* (2013.01); *G08B 23/00* (2013.01); *G08B 25/016* (2013.01)

(56) References Cited

U.S. PATENT DOCUMENTS

| | | | |
|---|---|---|---|
| 6,600,812 | B1 | 7/2003 | Gentillin et al. |
| 7,058,710 | B2 | 6/2006 | McCall et al. |
| 7,096,102 | B1 | 8/2006 | Parker, Sr. |
| 7,133,611 | B2 | 11/2006 | Kaneko |
| 7,212,111 | B2 | 5/2007 | Tupler et al. |
| 8,461,983 | B2 | 6/2013 | McCauley |
| 8,624,727 | B2 | 1/2014 | Saigh et al. |
| 8,755,779 | B1 | 6/2014 | Burks et al. |
| 8,769,013 | B1 | 7/2014 | Cona et al. |
| 9,344,330 | B2 | 5/2016 | Jacob et al. |
| 2004/0249250 | A1 | 12/2004 | McGee et al. |
| 2014/0106726 | A1 | 4/2014 | Crosbie et al. |
| 2014/0114691 | A1 | 4/2014 | Pearce |
| 2014/0146170 | A1 | 5/2014 | Tofighbakhsh |
| 2014/0180725 | A1 | 6/2014 | Ton-That et al. |
| 2014/0201315 | A1 | 7/2014 | Jacob et al. |
| 2014/0253327 | A1 | 9/2014 | Tinaphong et al. |
| 2014/0278573 | A1 | 9/2014 | Cook |
| 2014/0358592 | A1 | 12/2014 | Wedig et al. |
| 2015/0154712 | A1 | 6/2015 | Cook |
| 2015/0287310 | A1 | 10/2015 | Deliuliis et al. |

FOREIGN PATENT DOCUMENTS

| | | |
|---|---|---|
| CN | 203455934 U | 2/2014 |
| JP | 2002056060 A | 2/2002 |
| KR | 20060128169 A | 12/2006 |
| KR | 20060128178 A | 12/2006 |
| WO | 2013072867 A1 | 5/2013 |

OTHER PUBLICATIONS

Life Without Worry! Reliance Protectron Security Services, 2012, pp. 1-32.
Lynx Plus Series Security System User Guide, Honeywell, Dec. 2009, pp. 1-64.
Transportation Industry Cargo Theft Prevention—SafeKey System, Downloaded from the internet: http://www.safekeycorporation.com/safekey-ignition-interlock-device/transportation-industry-cargo-theft-prevention/#top, Sep. 23, 2014, pp. 1-3.
Rogers Smart Home Monitoring "Now You'll know" quick Start Guide, Jan. 2014, pp. 1-20.
Sep. 13, 2017—(US) Non-Final Office Actioon—U.S. Appl. No. 14/628,953.
Mar. 9, 2018—(US) Final Office Action—U.S. Appl. No. 14/628,953.
Oct. 19, 2018—(US) Non-Final Office Action—U.S. Appl. No. 14/628,953.
May 24, 2019—(US) Notice of Allowance—U.S. Appl. No. 14/628,953.
Feb. 8, 2021—(US) Notice of Allowance—U.S. Appl. No. 16/570,148.

DETERMINING AN EVENT

CROSS REFERENCE TO RELATED APPLICATIONS

This application is a continuation of U.S. patent application Ser. No. 17/315,806, filed May 10, 2021, now U.S. Pat. No. 11,615,479 entitled DETERMINING AN EVENT, the entire disclosure of which is hereby incorporated by reference.

TECHNICAL FIELD

Aspects of the disclosure generally relate to receiving a signal and analyzing insurance information to assist in determining a nature of an event relating to the signal. In particular, various aspects described herein relate to receiving a signal from one or more computing devices, sensors, monitors, or third party devices associated with a location and determining the nature of an event, in order to respond in various ways such as sending emergency personnel, insurance adjusters and the like.

BACKGROUND

In current systems, the time between an insurance event and the response to the event, such as the dispatch of an adjustor to handle the event, or the initiation a claim, can be lengthy. In some cases, the user or owner of a property may be dealing with an emergency and may not have time to lookup contact information for an insurance provider in order to make contact with the insurance provider. In some cases, a user may be away from a property and not find out about an event until returning.

Therefore, improved systems and methods to address these and other shortcomings in the art are desired.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure relate to apparatuses, computer implemented methods and computer readable media for determining a nature of an event in a geographical location, for example, at a user's home, based on receiving a signal from a device located in the geographical location and comparing a property of the signal with information from an insurance database about previous events associated with the geographical location.

In accordance with aspects of the disclosure, one or more of several actions may be initiated, based on the nature of the event, for example, various personnel may be dispatched to the location, devices at the location may be controlled and/or an insurance claim may be initiated.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Aspects of this disclosure relate to systems and methods that may be utilized to enhance the safety of a user and help an insurance provider in responding to user needs.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
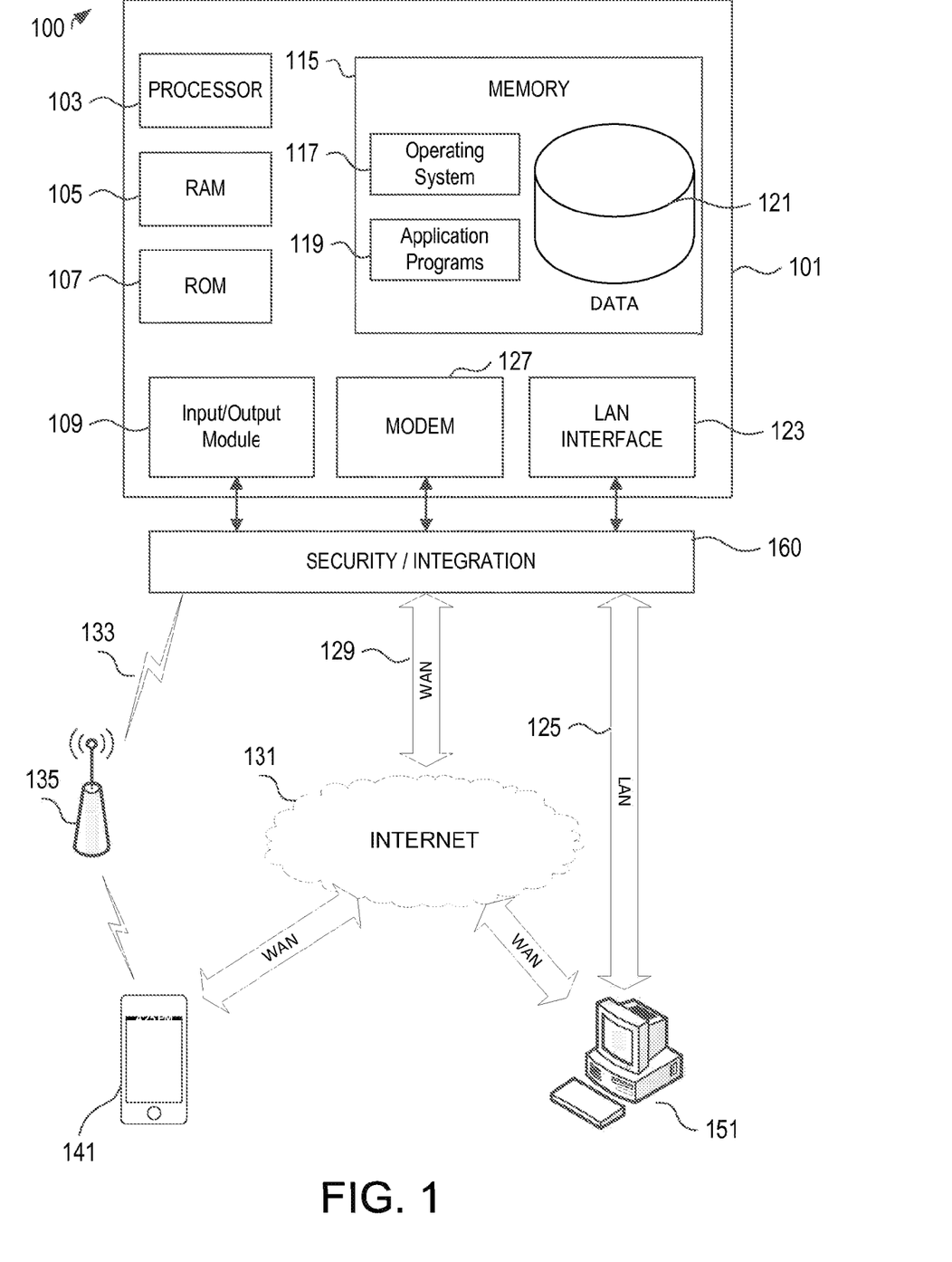
FIG. 1 is a block diagram of an example computing device that may be used according to an illustrative embodiment of the present disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as an insurance provider device or system, or a customer device or system, configured as described herein for performing various determinations and actions based on the user requests.

Input/Output (I/O) 109 may include a microphone, keypad, one or more buttons, touch screen, and/or stylus through which a user of the computing device 101 may provide input, and may also include one or more of a speaker for providing audio output and a video display device for providing textual, audiovisual and/or graphical output.

Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. In some examples, one or more nonvolatile hardware memory units having at least 5 gigabytes (GB) of memory may be used in device 101, in order to support sufficient numbers of user records in certain embodiments of the insurance provider systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 GHz or faster). Processor(s) 103 and its associated components may allow the system 101 to execute a series of computer-readable instructions, for example, to store and update user alerts, retrieve and analyze user insurance data from a clearinghouse, and perform various determinations and actions using the user data, such as processing queries or requests or postings.

The computing device may operate in a networked environment supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a local area network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1 is a security and integration layer 160, through which communications may be sent and managed between the computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 from external devices 141 and 151. In some cases, the security and integration layer 160 may correspond to a set of dedicated hardware and/or software operating at the same physical location and under the control of same entities as the computing device 101. For example, layer 160 may correspond to one or more dedicated web servers and network hardware in a datacenter or in a cloud infrastructure. In other examples, the security and integration layer 160 may correspond to separate hardware and software components which may be operated at a separate physical location and/or by a separate entity.

As discussed below, the data transferred to and from a computing device 101 may include secure and sensitive data, such as user location and identity data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In file-based integration, data files may be transmitted to and from the computing device 101 through the security and integration layer 160, using various network communication protocols. Secure data transmission protocols and/or encryption may be used in file transfers to protect to integrity of the user data, for example, File Transfer Protocol (FTP), Secure File Transfer Protocol (SFTP), and/or Pretty Good Privacy (PGP) encryption.

In a service-based integration, one or more web services may be implemented within the computing system 100 and/or security and integration layer 160. The web services may be accessed by authorized external devices and users to support input, extraction, and manipulation of the data in the server(s) 101. Web services built to support the service may be cross-domain and/or cross-platform, and may be built for enterprise use. Such web services may be developed in accordance with various web service standards, such as the Web Service Interoperability (WS-I) guidelines. In some examples, a web service may be implemented in the security and integration layer 160 using the Secure Sockets Layer (SSL) or Transport Layer Security (TLS) protocol to provide secure connections between the computing device 101 and various clients 141 and 151 attempting to insert or manipulate data within the clearinghouse. SSL or TLS may be used with HTTP or HTTPS to provide authentication and confidentiality. In other examples, a web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a insurance provider database) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of insurance providing systems, such as faster response times and less dependence on network conditions when accessing the insurance providing system to update or retrieve user alert information, or process requests for user services.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computer devices and insurance providing system components described herein may be configured to communicate using any of these network protocols or technologies.

Additionally, one or more application programs 119 may be used by the computing device 101 within an insurance providing system, including computer executable instructions for receiving and processing signals and maintaining, retrieving and analyzing user data (e.g., insurance claims, etc.), and performing other related functions as described herein.

Figure 2:
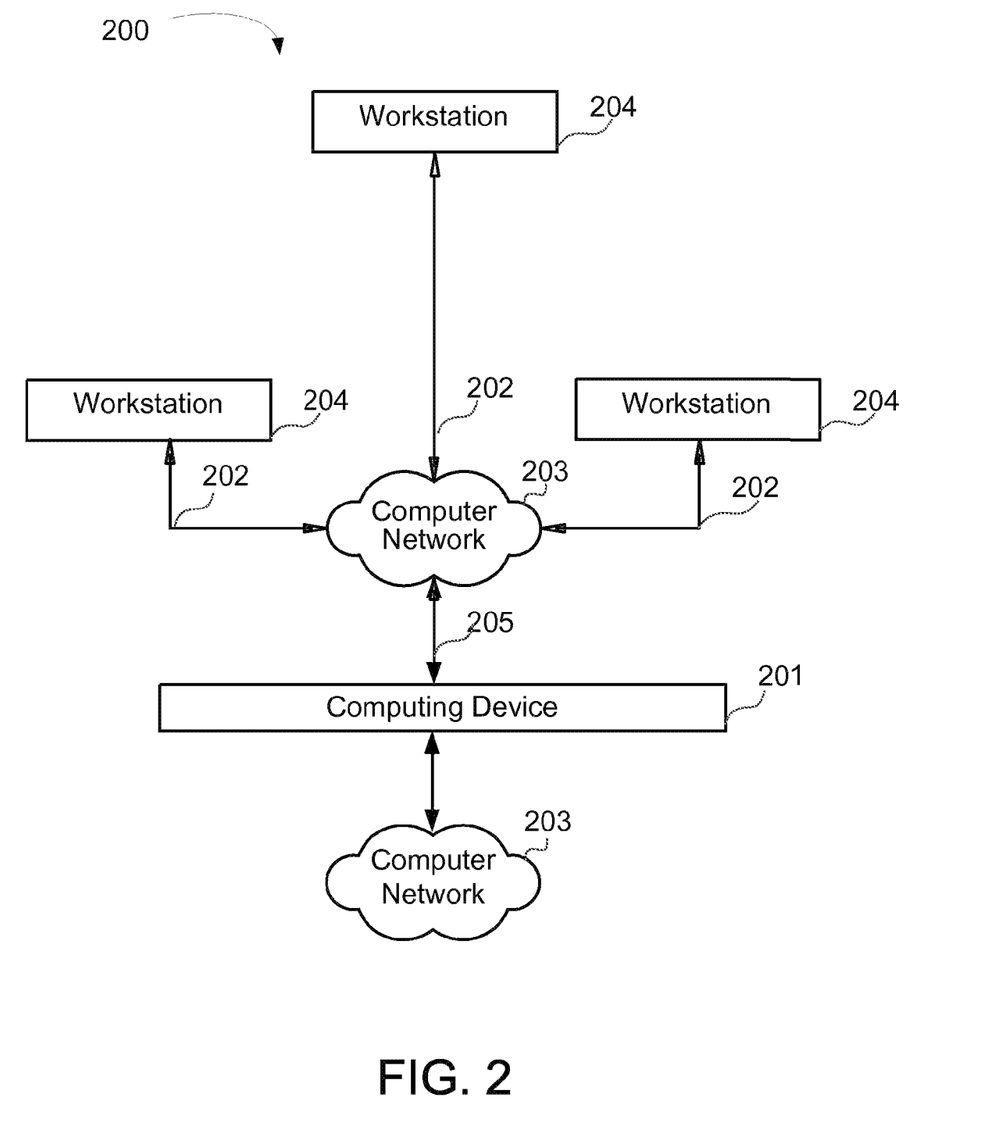
FIG. 2 illustrates an example network environment in which a system in accordance with the present disclosure may be implemented.

Referring to FIG. 2, an illustrative system 200 for implementing example embodiments according to the present disclosure is shown. As illustrated, system 200 may include one or more workstation computers 204. Workstations 204 may be local or remote, and may be connected by one of communications links 202 to a computer network 203 that is linked via communications links 205 to computing device 201. The computing device 201 may correspond to the computing device 101 previously described in connection with FIG. 1.

In an aspect of the disclosure, computing device 201 may provide for creation of new insurance claims, general tracking and managing of insurance claims, and claims processing to manage payment of benefits according to policy provisions.

While not shown in FIG. 2, the computer network 203 may comprise one or more switches, routers, servers, and additional workstations. Workstations 204 may include many of the same hardware/software components as computing device 201. In some embodiments, workstations 204 may comprise one or more data storage devices for storing customer data accessed and used by computing device 201. In other embodiments, workstations 204 may comprise various user terminals for accessing the computing device 201. In the system 200, computing device 201 may comprise any suitable server, processor, computer, or data processing device, or combination of the same. Computing device 201 may be used to process the instructions received from, and the transactions entered into by, one or more users, operators, and/or employees of an organization such as an insurance provider and the like.

Computer network(s) 203 may be any suitable computer network including the Internet, an intranet, a wide-area network (WAN), metropolitan area network (MAN), a local-area network (LAN), a wireless network, a digital subscriber line (DSL) network, a frame relay network, an asynchronous transfer mode (ATM) network, a virtual private network (VPN), or any combination thereof. Communications links 202 and 205 may be any communications link suitable for communicating between workstations 204 and computing device 201, such as network links, dial-up links, wireless links, hard-wired links, and the like.

Also in FIG. 2, customer terminals (not shown) may include any computing systems and devices, such as personal computers, mobile devices (e.g., mobile phones, personal digital assistants, mobile computing devices, etc.) laptop computers, tablets, or computer servers, that may be used by a current or potential insurance customer to communicate with an insurance provider. As discussed in more detail below, client software applications executing on customer terminals may provide the functionality for users/customers to establish connections with insurance provider servers and to submit customer data (e.g., signals) from users/customers to insurance providers. In order to facilitate communication with insurance providers and other insurance-related devices, customer terminals may include one or more client software applications configured to establish a communication session with an insurance provider server and to allow a user to perform various insurance-related actions, for example, a web browser (e.g., for web browser-based communication with insurance providers and other entities), a web-based mobile application (e.g., a mobile platform-based software application developed and published by an insurance provider, reinsurance company, financial institution, or other entity), or a stand-alone application (e.g., a non-web-based software application executable on a customer terminal).

In other embodiments, computing device 201 may be configured to perform certain data analysis and functionality, in addition to storing the insurance customer, policy data and claim data. In such cases, the computing device 201 may perform any insurance-related action that may otherwise be performed by an insurance provider or other computing device, such as determining insurance eligibility and terms for customers, processing insurance applications and requests for changes to existing policies, determining maximum combined coverage amounts for customers, etc.

In an aspect of the disclosure, a system is disclosed for determining an event associated with a signal from a geographic location. In an embodiment, an insurance claim may be initiated and/or generated in accordance with the nature of the event.

Figure 3:
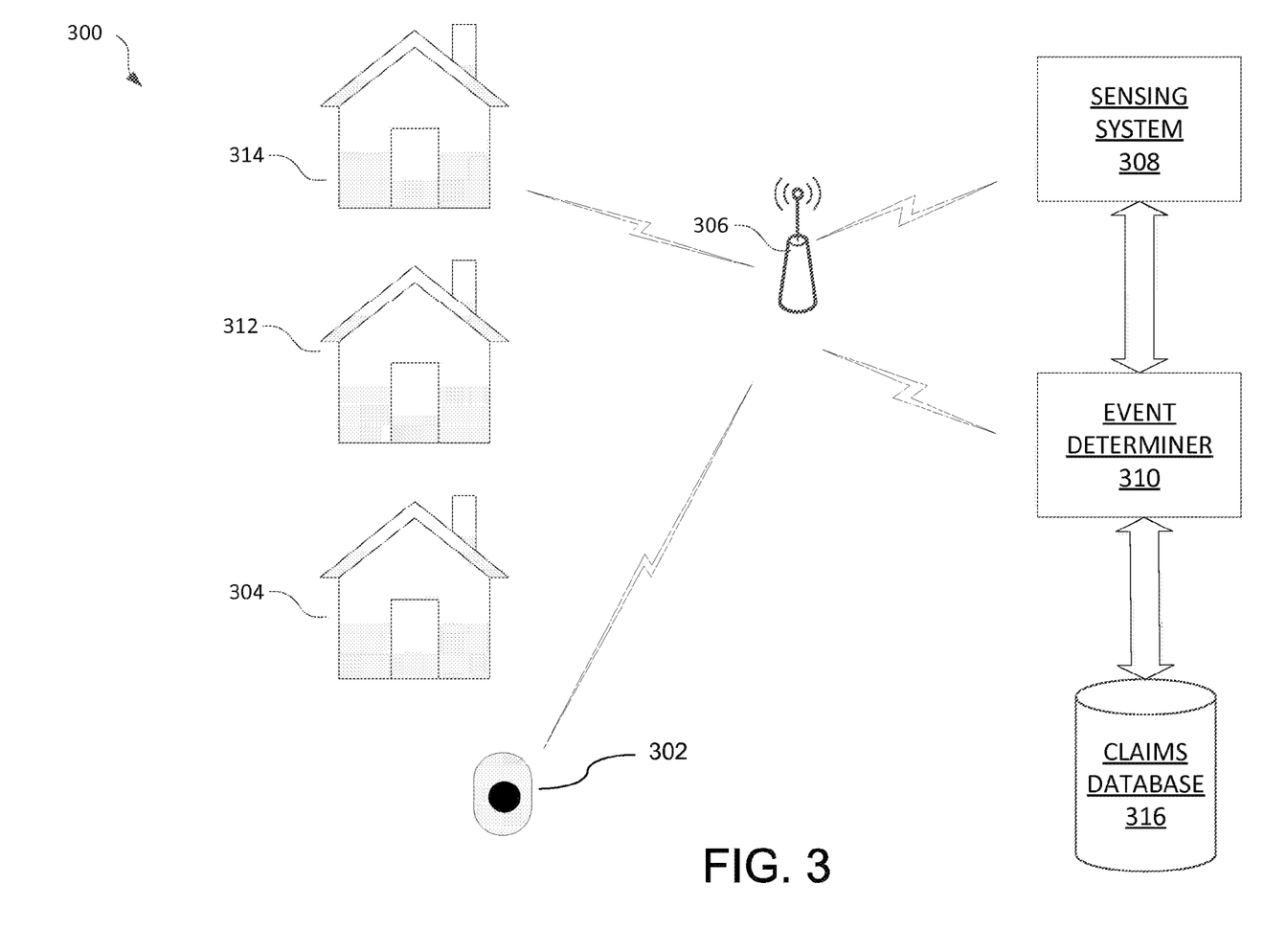
FIG. 3 is a schematic diagram of an example data collection system according to one or more aspects described herein.

In some embodiments, the system may allow for a user to notify an insurance carrier of an event comprising an abnormal operation condition of a home with a single button press. FIG. 3 is a schematic illustration of a sensing and/or monitoring system arrangement according to one or more aspects described herein. As shown in FIG. 3, the arrangement 300 may include an alerting device 302. In some embodiments, the alerting device 302 may provide a button that a user may press to transmit a signal. In some embodiments, the alerting device may include a single button (as illustrated in FIG. 3, item 302), in order to simplify activation by a user. In other embodiments, the alerting device may include multiple buttons. In some embodiments, the alerting device may transmit a signal upon the pressing of one or more buttons multiple times. In some embodiments, the alerting device may transmit a signal upon the pressing multiple buttons, for example, in a particular sequence. In still other embodiments, the alerting device may include a user interface, for example, a touch screen, providing selectable regions which can be selected to cause the alerting device to transmit a signal.

Upon activation of the alerting device, a signal may be transmitted. The contents of the signal include various data, according to the embodiment. In a simple implementation, the signal may contain the identity of the alerting device, for example, a serial number or assigned user ID. In other embodiments, the signal may contain additional or other information, such as information more descriptive of an environmental condition or of an abnormal condition of a home, vehicle or user, among others.

In some embodiments, the alerting device 302 may provide haptic feedback to a user to indicate that a button has been pressed or that the alert signal has been or is being transmitted. In still other embodiments, the alerting device may itself determine that a signal should be transmitted, for example, after receiving a communication from a sensor device, and indicate to the user that the button should be pressed. The indication may be provided by haptic means, for example, by vibrating. In certain embodiments, the alerting device may receive communication from a sensor and, in response, may transmit the signal without user input. Various modes of operation as described herein may be programmable or configurable by a user or by an insurance provider.

The alerting device 302 may communicate a signal to a sensing system 308. In some examples, the signal may be wirelessly transmitted and may be transmitted to a base collection unit 306 prior to transmission to an event determiner 310 at an entity, such as an insurance provider. Signals from one or more alerting devices may be transmitted to a sensing system 308. In an aspect of the disclosure, sensing system 308 may transmit the received information to event determiner 310 in order that an event associated with the signal from alerting device 302 may be determined. Alternatively, the signals may be transmitted directly to an event determiner 310, e.g., via wired or wireless means. In some arrangements, data from one or more signals may be collected in real-time and/or transmitted in real-time or near real-time. Additionally or alternatively, the data may be collected and/or transmitted in batches.

In response to receiving a signal, event determiner 310 may employ one or more processes to determine the nature of an event associated with the signal. In some embodiments, a property of the signal, such as a time of day it was received, may be sufficient to determine a nature of the event.

In some embodiments, a claims database 316 containing previous insurance claims may be analyzed to determine a similarity between one or more previous insurance claims and the signal. For example, an analysis of data from previous insurance claims may suggest that alert signals occurring on a particular day of the week and time of day at the location are most likely due to a burglary. Continuing the example, the event determiner 310 may determine that the abnormal condition at the location which led to the signal is a burglary event and various actions may be taken, such as dispatching emergency personnel or notifying neighbors. In other embodiments, various events may be determined, for example, faulty water heater, roof damage, a false alarm or a fire. These are examples of the types of events that may be determined and are not meant to be limiting of the types of events that may be determined. Those skilled in the art would appreciate that various other events may be determined, given the methods disclosed herein.

In some embodiments, the event determiner 310 may search claims database 316 containing previous insurance claims in order to locate one or more claims associated with the geographical area from which the signal was received. These previous insurance claims may have been input into the claims database 316 via any existing means and/or the previous insurance claims may have been generated based on previous signals, such as from an alerting device. In some embodiments, other databases, including databases external to the insurance provider, may be accessed for insurance claims or other information about events in the geographic location. In addition, various other additional outside data sources may also be collected and utilized. Such sources of data may include police reports, alarm companies, governmental agencies, etc.

Having located one or more previous insurance claims associated with the geographical location, the event determiner 310 may filter or otherwise evaluate attributes of the previous insurance claims in order to identify one or more previous insurance claims with an attribute in common with the signal. Depending on the embodiment, various attributes may be evaluated. For example, in some embodiments, the time of day and/or the day of week of the event associated with the previous insurance claim may be evaluated. In other embodiments, a detailed identification of a location may be evaluated. In still other embodiments, event determiner 310 may determine a nature of the event based upon analysis of accumulated sensor data.

In some embodiments, an alerting device 302 may be provided to a homeowner so that it may be used to alert authorities and/or an insurance provider to an abnormal condition of the home. In some embodiments, the alerting device may be specialized to serve a particular alerting function, such as for alerting a fire department and/or surrounding neighbors in the event of a fire. In some embodiments, the specialized alerting function may alert the police department. In some embodiments, whenever the alerting device is activated, a report may be generated and transmitted to the insurance provider. In some embodiments, a button on the alerting device may be pressed to signal that help is needed. In such embodiments, a particular number of presses of the button may provide an indication of the type of event (e.g. fire, burglary, flood, smoke). For example, one button press may represent one type of event, while two presses of the button may represent another type of event. In other embodiments, multiple buttons may be provided, for example, some embodiments may provide three buttons. In embodiments with multiple buttons, a unique event type may be assigned to each button. It should be understood by those skilled in the art that the buttons described herein may be physical buttons, but they may, in some embodiments, be implemented by others means, for example, as touch areas on a touch screen of an electronic device, such as a tablet or a mobile phone.

The alerting function described above in relation to the alerting device 302 may be incorporated into one or more devices in a home 304. For instance, one or more sensors or sensing devices may include an alerting function or may be communicatively coupled with an alerting device. For example, various sensors may sense the operating condition of various appliances, such as hot water heaters, refrigerators, washing machines, dryers, furnaces, air conditioning units, security systems and the like. In some examples, sensors or other monitoring devices may be arranged on or integrated into roofing or other building materials, and the like. Other home devices may include sensors or be monitored, without departing from the invention. In some examples, various types of sensors may be used with the sensing and/or monitoring system. For instance, power sensors, water sensors, heat or smoke sensing devices, flame sensors, glass breakage sensors and the like, may be used. In an embodiment, event determiner 310 may analyze data from the various sensing devices in order to determine the nature of an event at a particular location.

In some embodiments, an insurance provider may activate various devices in the home, in response to receiving the signal and/or determining a nature of the event related to the signal. For example, the insurance provider may turn on lights and/or open, lock or unlock one or more doors or windows, shut off a water supply, and/or play loud music or generate other audible alerts. In some embodiments, the water supply to a home may be shut off, for example, when the nature of the event may be determined to be flooding. In some embodiments, the alerting device or other data collection device may begin collecting information, such as sensor information, from the location or nearby locations, such as nearby homes.

In some embodiments, when the alerting device is activated, environmental or sensor data may be immediately captured and reported to an insurance provider.

The insurance provider may be able to determine the type of event based on the time that the signal is received, the location from where the signal came and insurance information related to nearby locations. For example, an insurance provider may compare the signal, or information related to the signal, with information from other houses nearby.

In some embodiments, the insurance provider may begin an insurance claim automatically after reception of the signal.

In some embodiments, the insurance provider may have received signals from other alerting devices, activated by neighbors in the recent past. In some embodiments, the insurance provider may analyze the time of day of the previous activations, over a period of time, for example, over the prior three months, in order to identify one or more events possessing an attribute in common with the signal from an alerting device.

In other embodiments, the insurance provider may receive signals from other alerting devices, activated by neighbors within a short time period of receiving a signal from a particular user. In such embodiments, the occurrence of multiple signals from neighboring locations, such as homes 312 and 314, when analyzed by an insurance provider, may provide an indication of the nature of the event. In other embodiments, the insurance provider may analyze previously entered insurance claims related to the location.

Upon receiving a signal and/or determining a nature of the associated event, the insurance provider may dispatch staff or otherwise contact others to respond to the event. In some embodiments, an insurance provider may dispatch a drone to collect more information, deliver materials or otherwise provide assistance at the location.

In some embodiments, the insurance provider may communicate with other devices, for example, devices nearby the alerting device, to obtain additional information that may be used in determining the nature of the event or in responding to the event. In some embodiments, the insurance provider may begin saving information, such as from nearby surveillance systems. In some embodiments, the insurance provider may initiate recording from nearby cameras. In some embodiments, the home 304 depicted in FIG. 3 may include a plurality of appliances and/or systems and one or more of the appliances and/or systems may be monitored by one or more sensing devices.

In an embodiment, information about an event at one home may be shared by the insurance provider with other homes in the same neighborhood. For instance, FIG. 3 illustrates additional homes 312 and 314 which along with home 304 may comprise homes in a common neighborhood. The neighborhood may be defined by a number of particular streets or addresses or even by zip codes. Homes located within the same neighborhood may share information in order to notify each other of events. For example, if the insurance provider determines, based on a signal, that a burglary may be ongoing at home 304, a message may be transmitted to home 312 and home 314 to alert them to the potential danger and to have them take preventive measures such as turning on all exterior lights. In an embodiment, homes willing to share such data with an insurance provider and with other homes may be eligible for discounted insurance premiums or other incentives.

In an aspect of the disclosure, sensing system 308 may log the time of day that an event occurs such as the time a signal is received from alerting device 302, and the like. In addition, sensing system 308 may log times of receiving signals from other devices.

Figure 4:
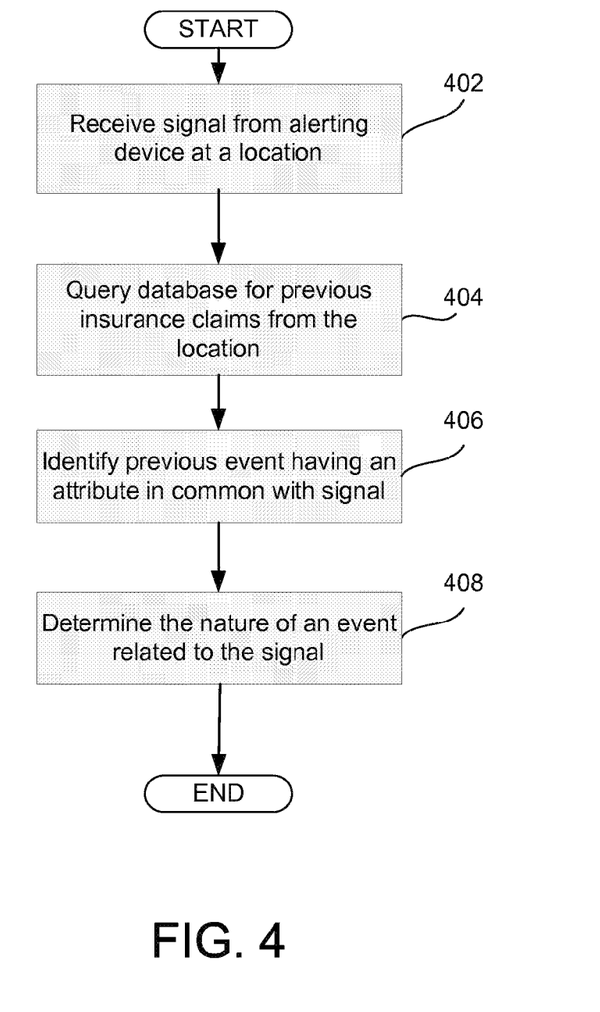
FIG. 4 illustrates a flow diagram of an example process in accordance with aspects of the present disclosure.

FIG. 4 illustrates a flow diagram for an example process in accordance with aspects of the present disclosure. At step 402, a signal may be received from an alerting device, such as alerting device 302 of FIG. 3. At step 404, an insurance database may be queried for information of previous events that occurred at the location or nearby the location. At step 406, a previous event having an attribute in common with the signal may be identified. For example, one or more of the previous events may have occurred at the same time of day as the received signal. In some embodiments, the day of the week may be an attribute that may be found in common. At step 408, the nature of the event may be determined, based on the previous event having the common attribute. It can be understood that various algorithms may be used to determine the event, depending on the type and amount of information available. Determining based on a time of day is one example method.

In some embodiments, the alerting device may enhance the personal security of a user by providing a means to quickly send an alert signal to an insurance provider or others. In some embodiments, the form factor of the alerting device may be portable to enable a user to use the alerting device while on the move. For example, the alerting device may be incorporated into a key fob for easy access by the user. The alerting device may be provided by parents to their children as a safety enhancement. In some embodiments, the alerting device may replace a traditional panic button, for example, like those used in a bank or other business at risk of being burglarized. For example, an employee may carry an alerting device in a pocket or purse such that it may be engaged discreetly in an emergency situation and may share the data with authorities, insurance providers, and/or the employer.

In various embodiments, the function of the alerting device may be incorporated into various other devices, such as a mobile phone, a watch, eye glasses, clothing or other wearable items. In embodiments wherein the alerting device is incorporated into a mobile phone, pressing and holding the up and down volume buttons may cause the signal to be transmitted. In some embodiments, the alerting device may send a text message or other electronic message to authorities. In mobile phone embodiments, an internal GPS capability may be leveraged to provide a location to the insurance provider. In some embodiments, authorities may be called immediately upon activation of the alerting device. In such an embodiment, the user who activated the alert signal may be able to further specify the event which led to the activation. In some embodiments, the mobile phone may provide a user interface with a dialog box containing language, such as, "press a button", which, when activated, may notify an insurance provider of an event and may provide additional information about the event. The insurance provider may analyze, store and/or manage the information received from the mobile phone.

In some embodiments, the alerting device may be pre-programmed to cause a phone call or a message to be sent to selected contacts. In some embodiments, an insurance provider may pre-program some or all of the contacts that are to receive phone calls or messages. In some embodiments, the alerting device may cause a personalized message to be transmitted by the alerting device or by the insurance provider. In these embodiments, the personalized message may be different, based on the determined event.

In some embodiments, an insurance provider may provide a service in which a user may activate the signal when they want someone to walk with them. This service may be useful to a user who prefers not to walk alone, for example, at night. Users nearby may be able to meet the user and walk with them to their destination or along their intended path. In some embodiments, in response to the reception of a signal, the insurance provider may notify other users who may be nearby, for example, users who have been vetted as safe or responsible users. In some embodiments, crowd sourcing may be employed to locate users willing to accompany the user who activated the device. Functions of the crowd sourcing may be performed by the insurance provider or the functions may be performed by another system. In some embodiments, users may opt in or out of various services and may be provided discounts or other benefit for consenting to provide assistance when requested by the insurance provider.

As disclosed above, in some embodiments, the alerting device may detect its location and provide location information to an insurance provider. In some embodiments, if the alerting device is detected to have gone outside of a particular area or beyond a certain range from a location, appropriate personnel may be notified. An alert may be provided or personnel notified when the device is detected outside of its normal area.

In some embodiments, upon receiving a signal from an alerting device, an insurance provider may automatically start an insurance claim and may begin to populate data into the claim. For example, upon receiving a signal and determining that an event is a fire, the insurance provider may automatically begin an insurance claim and populate available information, such as address, insured user name, policy number, incident, date, time, etc., into the claim. The completed or in-progress claim may be transmitted to a user or to others, such as an insurance adjustor or repair personnel.

In some embodiments, upon activation, an alerting device may gather environmental information, including time of day, location, identifying information of the insured user, recent locations of the device and other information and send to an insurance provider. In some embodiments, information may be continuously collected by the alerting device, even before alerting, so that the portions of the collected history information may be provided to the insurance provider. For example, the alerting device, or other devices in communication with the alerting device (e.g. third-party devices), may contain a memory buffer able to store various sensor data or other information for 90 seconds. In order to protect the privacy of others, information from any third-party devices may be collected in an anonymous manner, so that the third party providing the information may be protected. Continuing the example, at any time the alerting device is activated, the previous 90 seconds of collected information may be transmitted to the insurance provider.

In some embodiments, environmental data, recent locations or similar device activations may be analyzed by the insurance company to aide in determining the event.

In some embodiments, the alerting device 302 may notify others in addition to the insurance provider, including emergency personnel, roadside assistance or other third parties.

In some embodiments, an alerting device may be installed or otherwise associated with a vehicle (e.g. an automobile) in order to quickly alert an insurance provider that a customer has had a loss. In some embodiments, the insurance provider may contact the customer within a short period of time after a loss is detected. In various embodiments, the insurance provider may contact authorities, family members or a towing company. In some embodiments, the insurance provider may contact family or other user contacts prior to contacting third-parties. In some embodiments the alerting device may be of a form factor that may attach to a sun visor of a vehicle in a manner similar to how a garage door opener may attach to a sun visor.

The alerting device may be configured to connect to one or more devices (e.g., a GPS, sensors, etc.) installed in the vehicle to collect information. In some embodiments, the alerting device may be a system including multiple devices. The alerting device may be configured to interface with one or more vehicle sensors (e.g., fuel gauge, tire pressure sensors, engine temperature sensors, etc.). The alerting device may be configured to communicate directly or indirectly with the vehicle telematics management system.

In some embodiments, the alerting device may communicate via an automobile OBDII interface using wired or wireless communications. In some embodiments, the alerting device may receive information from the vehicle and automatically transmit information to an insurance provider. In some embodiments, the alerting device may be configured to collect drive data using, e.g., an accelerometer, GPS, gyroscope, etc. of the alerting device and/or of the automobile. Drive data may include vehicle telematics data or any other data related to events occurring during a vehicle's trip (e.g., an impact to a part of the vehicle, a deployed airbag, etc.). For example, drive data may include location information, such as GPS coordinates, indicating the geographical location of the alerting device as well as speed and acceleration data that may be used to detect speeding and hard-braking events.

In some embodiments, upon receiving a signal from an alerting device associated with an automobile, the insurance provider may predict a potential emergency, for example, a break-in, car accident, flat tire, etc., based on information from the device. For example, the alerting device may interface with systems in a vehicle that are capable of providing information or status of various systems, including tire pressure monitoring systems or security systems. In other examples, based on the time of receiving the alert and the location of the vehicle, it may be possible to determine the event.

In some embodiments, upon receiving a signal from an alerting device in an insured user's automobile, the insurance provider may activate devices in the automobile, such as turning off the ignition, applying braking and/or deploying an air bag. Various other actions may be initiated in order to prevent an accident.

In some embodiments, the insurance provider may provide customers a discount on their insurance or assign a preferred insurance rating to those customers using the alerting device.

In some embodiments, the alerting device may enhance the safety of a user, for example, a user who might be living alone and might get into a situation in their home where they are unable to reach a phone. In some embodiments, a person's actions may cause automatic activation of the alerting device. For example, the alerting device may detect that a user has fallen and provide an alert to an insurance provider. The alerting device may be worn around a user's neck or otherwise near or on the user.

In other embodiments an application associated with the alerting device may guide a user through the steps of collecting information to report or complete an insurance claim. In some embodiments, the collection may be made interesting or pleasant to a user by incorporating amusement into the process. In such embodiments, an interface of the alerting device, or of another device associated with the alerting device, may provide a game-like experience to a user to guide the user through the collection of information for the insurance provider. For example, once a button is pressed to cause an alert, a software application may aid in capturing additional information through a game-like experience. In some embodiments, a user may be awarded points, cash, or other benefits for collecting the information. In some embodiments, a mobile application may provide a user interface to guide a user through the steps of collecting information to report an insurance claim.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

The invention claimed is:

1. A method comprising:
receiving, from a user device or a sensor located in a first building at a first geographical location, a signal indicative of a current insurance event associated with the first building;
identifying, by a computer processor, whether one or more previous insurance events has an attribute in common with the current insurance event, the one or more previous insurance events being associated with a second building at a second geographical location that is different from the first geographical location;
determining a nature of the current insurance event, based at least in part on the identifying that the one or more previous insurance events has the attribute in common with the current insurance event; and
in response to determining the nature of the current insurance event, directing, by the computer processor based on the determined nature of the current insurance event, a controller in the first geographical location to control one or more of a mechanical function or an electrical function of the first building, wherein the one or more of the mechanical function or the electrical function comprises one or more of: locking a door of the first building, unlocking the door of the first building, shutting off water to the first building, initiating an audio alarm device in the first building, turning on a light in the first building, or turning off the light in the first building.

2. The method of claim 1, further comprising:
querying a database for information regarding the one or more previous insurance events associated with the second building at the second geographical location, wherein the information regarding the one or more previous insurance events comprises at least one insurance claim associated with the second building.

3. The method of claim 1, wherein the attribute comprises a time of day of an occurrence of the at least one of the one or more previous insurance events.

4. The method of claim 1, further comprising:
automatically initiating an insurance claim comprising information of the current insurance event.

5. The method of claim 1, further comprising:
notifying personnel of the current insurance event, wherein the personnel comprises one or more of: a repair person, an insurance adjustor, an emergency responder, safety personnel, a home owner, or a neighbor.

6. The method of claim 1, wherein the first geographical location comprises an address, GPS coordinates, a zip code, a neighborhood or a street.

7. The method of claim 1, wherein the insurance event comprises an abnormal operation condition of the first building, and the abnormal operation condition comprises one or more of: a faulty water heater, roof damage, a false alarm, or a break-in.

8. The method of claim 1, further comprising:
communicating with a data collection device at the first geographical location; and
collecting information for use in the determining the nature of the current insurance event.

9. The method of claim 1, wherein the user device or the sensor comprises a smoke detector, a moisture detector, a microphone, a roof monitor, or a home security system.

10. The method of claim 9, wherein the user device or the sensor comprises the smoke detector, and wherein the current insurance event of the first building is a fire.

11. An apparatus comprising:
a processor; and
a memory storing instructions, which when executed by the processor, cause the apparatus to:
receive, from a user device or a sensor located in a first building at a first geographical location, a signal indicative of a current insurance event associated with the first building;
identify whether one or more previous insurance events has an attribute in common with the current insurance event, the one or more previous insurance events being associated with a second building at a second geographical location that is different from the first geographical location;
determine a nature of the current insurance event, based at least in part on the identifying that the one or more previous insurance events has the attribute in common with the current insurance event; and
in response to determining the nature of the current insurance event, directing, based on the determined nature of the current insurance event, a controller in the first geographical location to control one or more of a mechanical function or an electrical function of the first building, wherein the one or more of the mechanical function or the electrical function comprises one or more of: locking a door of the first building, unlocking the door of the first building, shutting off water to the first building, initiating an audio alarm device in the first building, turning on a light in the first building, or turning off the light in the first building.

12. The apparatus of claim 11, further comprising: querying a database for information regarding the one or more previous insurance events associated with the second building at the second geographical location, wherein the information regarding the one or more previous insurance events comprises at least one insurance claim.

13. The apparatus of claim 11, further comprising instructions that, when executed by the processor, cause the apparatus to collect information from a data collection device at the first geographical location, wherein the data collection device comprises: a smoke detector, a moisture detector, a camera, a microphone, a roof monitor, or a home security system.

14. The apparatus of claim 11, further comprising instructions that, when executed by the processor, cause the apparatus to determine the current insurance event condition of the first building.

15. The apparatus of claim 14, further comprising instructions that, when executed by the processor, cause the apparatus to automatically initiate an insurance claim based on the current insurance event of the first building.

16. The apparatus of claim 14, further comprising instructions that, when executed by the processor, cause the apparatus to notify a home owner or safety personnel of the current insurance event of the first building.

17. A system comprising:
a first device and a second device, wherein the second device is located in a first building at a first geographical location,
wherein the first device comprises:
one or more first processors; and
first memory storing instructions that, when executed by the one or more first processors, cause the first device to:
receive, from the second device, a signal indicative of a current insurance event associated with the first building;
identify whether one or more previous insurance events has an attribute in common with the current insurance event, the one or more previous insurance events being associated with a second building at a second geographical location that is different from the first geographical location;
determine a nature of the current insurance event, based at least in part on the identifying that the one or more previous insurance events has the attribute in common with the current insurance event of the first building; and
in response to determining the nature of the current insurance event, directing, based on the determined nature of the current insurance event, a controller in the first building to control one or more of a mechanical function or an electrical function of the first building, wherein the one or more of the mechanical function or the electrical function comprises one or more of: locking a door of the first building, unlocking the door of the first building, shutting off water to the first building, initiating an audio alarm device in the first building, turning on a light in the first building, or turning off the light in the first building, and
wherein the second device is a user device or a sensor comprising:
one or more second processors; and
second memory storing instructions that, when executed by the one or more second processors, cause the second device to:
send the signal indicative of the current insurance event.

18. The system of claim 17, further comprising: querying a database for information regarding the one or more previous insurance events associated with the second building at the second geographical location, wherein the information regarding the one or more previous insurance events comprises at least one insurance claim.

19. The system of claim 17, further comprising instructions that, when executed by the one or more first processors, cause the first device to automatically initiate an insurance claim comprising information of the current insurance event.

20. The system of claim 17, wherein the second device comprises a smoke detector, a moisture detector, or a roof monitor.

* * * * *